United States Patent Office 3,311,658
Patented Mar. 28, 1967

3,311,658
FLUOROCARBON ETHERS CONTAINING IODINE
Joseph Leo Warnell, Wilmington, Del., assignor to E. I. du Pont de Nemours and Company, Wilmington, Del., a corporation of Delaware
No Drawing. Filed Aug. 1, 1966, Ser. No. 569,018
3 Claims. (Cl. 260—544)

This application is a continuation-in-part of application Ser. No. 301,904, filed Aug. 13, 1963, now abandoned.

The present invention relates to novel fluorocarbon ethers and to methods for their preparation. More particularly, the present invention relates to omega-iodofluorocarbon ether acids and acid derivatives.

The fluorocarbon ethers of the present have the general formula:

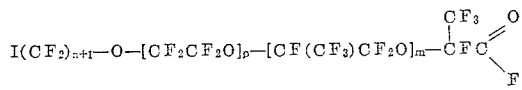

where $n$ is an integer from 1 to 8 inclusive, preferably 1 or 3, $m$ is an integer from 0 to 5 inclusive, and $p$ is an integer from 0 to 5 inclusive, preferably 0 or 1.

The fluorocarbon ethers of the present invention may be prepared by the condensation of fluorocarbon epoxides with omega-iodofluorocarbon acid fluorides or omega-iodofluorocarbon ether acid fluorides as illustrated below:

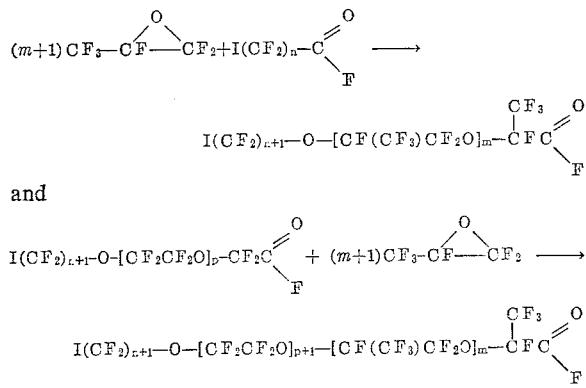

where $n$ and $m$ have the above-indicated meaning and $p$ is an integer from 0 to 5 inclusive, preferably 0 or 1.

The omega-iodofluorocarbon ethers prepared by this reaction are then further reacted through standard chemical reactions to form the carboxylic acid and the carboxylic acid derivatives. The iodoperfluoroacyl fluorides useful as intermediates include iododifluoroacetyl fluoride and reaction products obtainable by the telomerization of tetrafluoroethylene in the presence of iododifluoroacetyl fluoride as illustrated in Example III below. Hexafluoropropylene epoxide may be prepared by the oxidation of hexafluoropropylene using aqueous alkaline hydrogen peroxide. Tetrafluoroethylene epoxide may be prepared by the oxidation of tetrafluoroethylene with $O_2$ in the presence of catalytic amounts of $Br_2$ and using actinic radiation.

Omega-iodoacid fluorides containing from 0 to 5 and more recurring tetrafluoroethylene epoxide units may be obtained by the reaction of omega-iodoperfluoromethylene acid fluorides with tetrafluoroethylene epoxide as disclosed in my copending application, Ser. No. 185,232, filed Apr. 5, 1962, now U.S. Patent No. 3,250,806. These omega-iodoacid fluorides react with one or more moles of hexafluoropropylene epoxide to yield the products of this invention.

The reaction of the hexafluoropropylene epoxide with the iodoperfluoroacyl fluoride is preferably carried out in a polar organic medium. Suitable media are organic solvents liquid at the reaction temperature and capable of dissolving, i.e., to an extent of greater than 0.01 weight percent, perfluorocarbon alkoxides of alkali metals and specifically cesium perfluoropropoxide. The alkoxides can be formed by the reaction of metal fluorides with perfluoroacetyl fluoride or perfluoropropionyl fluoride. In particular, however, the preferred organic solvents used in combination with hexafluoropropylene epoxide are aliphatic polyethers having from 4 to 16 carbon atoms, and hydrocarbon nitriles having from 2 to 12 carbon atoms, such as the dimethyl ether of ethylene glycol, propionitrile, benzonitrile, and acetonitrile.

The reaction can also be run conveniently in nonpolar solvents with quaternary ammonium salts present in catalytic amounts. These salts can be $Cl^-$,

or the like, and all are converted in situ to $Y_4N^+F^-$, where Y is a hydrocarbon or a halogenated hydrocarbon. Suitable nonpolar solvents include halogenated hydrocarbons of the general formula:

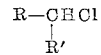

where R and R' represent a hydrocarbon, a halogen, a halogenated hydrocarbon or hydrogen. Specific examples of such solvents are $CH_2Cl_2$, $CHCl_3$, $Cl_2CHCHCl_2$, and $H(CF_2CF_2)_2CH_2Cl$.

The catalysts suitable for the reaction of the hexafluoropropylene epoxide with the iodoperfluoroacyl fluorides include the alkali metal fluorides, quaternary ammonium fluorides, silver fluorides and alkali metal perfluoroalkoxides. The metal fluorides may be used as such or admixed with other alkali metal halides. Such mixtures are, e.g., mixtures of LiCl–CsF, LiCl–KF, and LiBr–KF. The in situ generation of fluoride ions takes place at all suitable reaction conditions. Thus, such quaternary ammonium salts are carboxylates, chlorides, iodides, bromides, cyanides, and quaternary salts of other monovalent anions. Examples of the quaternary ammonium salts useful in the present invention are tetraethyl ammonium cyanide, tetraethyl ammonium bromide, tetrabutyl ammonium acetate, trimethylcetyl ammonium fluoride, and dimethyl dibutyl ammonium cyanide. Catalyst concentration is not critical. In general, the concentration of the catalyst is at least 0.01% by weight of the fluorocarbon epoxide. The catalyst may be present either in solution or as a separate phase.

Reaction temperature is not critical and may be greatly varied, e.g., from about −80 to about 200° C., although a preferred range is from −60 to 100° C. Pressures ranging from below atmospheric pressure to several hundred atmospheres have been employed and it has been established that pressure is not a critical factor in the process described. Pressure is primarily employed for convenience, depending on the physical properties of reactants at any selected reaction temperature. The fluorocarbon ethers of the present invention include the one-to-one addition products of the fluorocarbon epoxides and the iodoperfluoroacyl fluorides and the polyethers formed by the reaction of these one-to-one addition products with additional molecules of the epoxide. The degree of polymerization obtained depends on the reaction temperature and the ratio of the fluorocarbon epoxide to the iodoperfluoroacyl fluoride. At high temperatures, a lower degree of polymerization is obtained than at lower temperatures. However, the reaction is more strongly affected by the ratio of the reactants. Thus, at ratios of 1:1 substantially only the one-to-one addition product is formed. As the ratio of the fluorocarbon epoxides to the iodoperfluoroacyl fluoride is increased, the amount of fluorocarbon epoxide in the reaction product will increase resulting in products having a higher degree of polymerization. It is, however, to be realized that this control over the nature of the omega-iodofluorocarbon ethers obtained by the process of the present invention is not absolute and does not prevent formation of some fluorocarbon ethers of either higher or lower molecule weight or both.

The present invention is further illustrated by the following examples.

*Example I.*—Into a 300 milliliter "Pyrex" flask were charged six grams of cesium fluoride, 80 milliliters of the dimethyl ether of diethylene glycol and 57.6 grams of iododifluoroacetyl fluoride. The mixture was cooled to 0° C. and 45 grams of hexafluoropropylene epoxide gas was added at 5 p.s.i.g. and 25° C. over a 1.25 hour period with continuous agitation. Fifteen ml. of fluorocarbon liquid separated as a lower layer and was removed. The top dimethyl ether of diethylene glycol layer was heated to recover 30 ml. of dissolved volatile fluorocarbons. Subsequent fractional distillation yielded 23 g. of recovered $ICF_2COF$ and 18.2 g. of crude $ICF_2CF_2-O-CF(CF_3)COF$. Infrared and NMR spectra were consistent with this structure.

*Example II.*—The process of Example I is repeated except that 135 g. of hexafluoropropylene epoxide is used and the reaction temperature is maintained at −10 to 0° C. The product obtained is a mixture of compounds of the structure

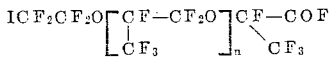

where $n=0, 1, 2, 3,$ and 4 together with homopolymers of hexafluoropropylene epoxide. The individual members of this series can be separated by distillation and purified by preparative scale gas chromatography.

*Example III.*—Into a dry "Monel" cylinder cooled to −190° C. was condensed 6.5 grams of $ICF_2COF$ and 3 grams of $C_2F_4$. The cylinder was heated to 220° C. for one hour to effect telomerization. After cooling to room temperature, the volatile reaction products were distilled to yield 0.3 gram of recovered $C_2F_4$, 7 grams of liquid acyl fluorides, and a high boiling residue of wax-like material. Separation of the 7 gram fraction by preparative scale vapor phase gas chromatography gave approximately 3 grams of recovered $ICF_2COF$, 3 grams of $$ICF_2CF_2CF_2COF$$

and small quantities of the homologous acyl fluorides. Infrared and NMR spectra were consistent with the indicated structure. Analysis calculated for $C_4F_7OI$: C, 14.8; F, 41.0. Analysis found: C, 15.13; F, 40.82.

*Example IV.*—The process of Example II is repeated with 81 g. of 4-iodoperfluorobutyryl fluoride prepared by the process of Example III substituted for the iododifluoroacetyl fluoride. The product is a mixture of compounds of the structure

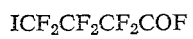

where $n$ varies from 0 to 4. The major products have $n=2$ and 3. These compounds can be separated by distillation and identified by gas chromatography. Trapping of individual members from the gas chromotographic analysis followed by infrared and nuclear magnetic resonance analyses serves to identify them.

*Example V.*—In a dry flask equipped with a magnetic stirrer and surrounded by a cooling bath is placed 250 mg. of tetraethylammonium cyanide and 20 ml. of $HCF_2CF_2CF_2Cl$. There is then introduced at −35° C. about 2 g. of tetrafluoroethylene epoxide to convert the catalyst to the fluoride form. There is then introduced 0.28 mole of $ICF_2CF_2CF_2COF$ prepared by the process of Example III. The temperature is maintained between −20° and −40° C. and tetrafluoroethylene epoxide is introduced slowly at 10 p.s.i. pressure over several hours. The reaction is stopped when 0.56 mole of epoxide has been consumed. The product at this stage is a mixture of compounds of the structure $$ICF_2CF_2CF_2CF_2O[CF_2CF_2O]_nCF_2COF$$

where $n$ varies from 0 to 2, the major product having $n=1$.

Without isolation of these intermediates, there is then added about 0.3 mole of hexafluoropropylene epoxide over a period of several hours at −20° C. to 0° C. This procedure converts the intermediates described above to compounds of the structure.

where $n$ varies from 0 to 2. The products can be isolated and purified by distillation or gas chromatography and characterized by infrared and nuclear magnetic resonance spectroscopy.

These omega-iodofluorocarbon ethers can be converted to vinyl ethers which can be polymerized to give valuable fluorocarbon resins capable of being cross-linked. These ethers alone have further utility as dispersing agents.

The starting material $ICF_2COF$ can be made by reacting an alkali metal iodide with tetrafluorethylene epoxide under conditions which restrict polymerization of the epoxide. The following procedure is applicable: Into a stirred one liter flask containing 134 g. (1.0 m.) of anhydrous LiI and 500 ml. of acetic anhydride at 0° C. is added 80 g. (0169 m.) of tetrafluoroethylene gas at 20 p.s.i. and 0° C., and over a 2 hour period. After this period, the volatile products in the flask are vacuum flash distilled from the flask and then re-distilled. There is obtained 60 g. of a fraction boiling between 37 to 40° C. which is identified by its infrared spectrum as $ICF_2COF$. Analysis calculated for $C_2F_3OI$: C, 10.7; F, 25.4. Found: C, 12.56; F, 25.50.

The omega-iodofluorocarbon ether acid fluorides of this invention are merely contacted with water (hydrolysis) to form the corresponding carboxylic acid.

As many apparently widely different embodiments of this invention may be made without departing from the spirit and scope thereof, it is to be understood that this invention is not limited to the specific embodiments thereof except as defined in the appended claims.

What is claimed is:

1. An omega-iodofluorocarbon ether acid fluoride having a general formula:

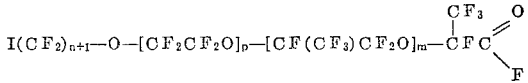

where $n$ is 1 or 3, $p$ is an integer from 0 to 5 inclusive, and $m$ is an integer from 0 to 5 inclusive.

2. A fluorocarbon ether acid fluoride having a general formula:

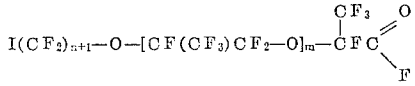

where $n$ is 1 or 3, and $m$ is an integer from 0 to 5 inclusive.

3. An omega-iodofluorocarbon ether acid derivative having the general formula:
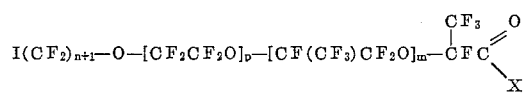
where $n$ is 1 or 3, $p$ is an integer from 0 to 5 inclusive, $m$ is an integer from 0 to 5 inclusive, and X is F or OH.
No references cited.
LORRAINE A. WEINBERGER, *Primary Examiner.*
R. K. JACKSON, *Assistant Examiner.*